United States Patent [19]

Lipinski et al.

[11] Patent Number: 4,798,062
[45] Date of Patent: Jan. 17, 1989

[54] PORTABLE FOOD FREEZER WITH INTERNAL HELICAL CONVEYOR

[75] Inventors: Thomas L. Lipinski, Plymouth; Joseph L. Goedker, St. Cloud, both of Minn.

[73] Assignee: Checker Machine, Inc., New Hope, Minn.

[21] Appl. No.: 187,294

[22] Filed: Apr. 28, 1988

[51] Int. Cl.⁴ .............................................. F25D 25/02
[52] U.S. Cl. ........................................ 62/381; 198/778
[58] Field of Search ........................... 62/381; 198/778

[56] References Cited

U.S. PATENT DOCUMENTS

| | | | |
|---|---|---|---|
| 3,269,142 | 8/1966 | DeMola et al. | 62/381 |
| 3,315,492 | 4/1967 | Dreksler | 62/381 |
| 3,348,659 | 10/1967 | Roinestad | 198/136 |
| 3,412,476 | 11/1968 | Anstrom | 62/381 |
| 3,664,487 | 5/1972 | Ballenger | 198/136 |
| 3,666,083 | 5/1972 | Smith | 198/136 |
| 3,733,848 | 5/1973 | Duron et al | 62/381 |
| 4,023,381 | 5/1977 | Onodera | 62/381 |
| 4,103,768 | 8/1978 | Persson | 62/381 |
| 4,324,110 | 4/1982 | Lovette, Jr.; et al. | 62/381 |
| 4,356,707 | 11/1982 | Tyree, Jr. et al. | 62/381 |
| 4,450,953 | 5/1984 | Le Cann et al. | 198/778 |
| 4,679,687 | 7/1987 | Rehm | 198/778 |

Primary Examiner—Ronald C. Capossela
Attorney, Agent, or Firm—Orrin M. Haugen; Thomas J. Nikolai; Frederick W. Niebuhr

[57] ABSTRACT

A refrigeration device includes an enclosed housing and a framework in the housing supporting an endless conveyor for movement in a helical path between inlet and outlet openings formed in the housing. Items of prepared food are provided to the housing at the inlet, then frozen as they are serially conveyed toward the outlet. The conveyor support framework includes pairs of radially inward and radially outward uprights, with elongate rods arranged radially and in a helical path between pairs of the uprights. Two flexible steel bands, provided with spaced apart apertures to slidably accommodate the rods, are installed upon the rods in concentric helixes. Low friction strips are installed with the bands and support the conveyor with respect to the bands.

16 Claims, 4 Drawing Sheets

PORTABLE FOOD FREEZER WITH INTERNAL HELICAL CONVEYOR

BACKGROUND OF THE INVENTION

The present invention relates to apparatus for treatment of articles as they are conveyed serially through a controlled environment, and more particularly to a refrigeration enclosure including an endless helical conveyor for serially carrying food items within the enclosure as they are frozen.

An endless conveyor, mounted inside a treatment enclosure and forming a helical path, is known to be useful for continuously and serially transporting items along the path as they are treated within the enclosure. The helical portion of the conveyor can be driven at a controlled velocity to treat each food item for a predetermined length of time as it traverses the helix. One arrangement is shown in U.S. Pat. No. 4,103,768 (Persson), including an endless belt mounted on a perforated revolving drum. A cooling or other treating apparatus is mounted inside the drum. The belt is supported movably on low friction blocks. U.S. Pat. No. 4,023,381 (Onodera) discloses a drum rotated by a drive motor. A cooler inside the drum includes a tube or coil. As seen from FIG. 3 of the patent, the endless belt includes chain-like members supported by rods extending transversely across the belt.

In U.S. Pat. No. 3,666,083 (Smith), an endless conveyor in a refrigerating unit includes a pair of chains, one radially outward of the other, connected by a series of crossrods which support the articles to be frozen. The conveyor is disposed about a pair of rotating drums, and is supported on a rail. A low friction layer is positioned between the conveyor and the supporting rail. U.S. Pat. No. 3,315,492 (Dreksler) shows a food refrigerating apparatus in which an endless conveyor belt is supported by parallel rails 36, to assume a helical path. The parallel rails are supported by horizontal and transverse arms. Spacers (FIG. 5) keep the rails parallel to one another. The apparatus includes a central drum, which preferably is rotated in the direction of conveyor belt travel to minimize friction between these members.

While perhaps satisfactory in many respects, the above devices require massive rotating drums, and means for rotating the drums with respect to stationary refrigeration housing. The rotating drum is a source of undue complexity, increased bulk, and interferes with circulation of cooling air throughout the enclosure.

Therefore, it is an object of the present invention to provide a treatment apparatus with an open, stationary framework for supporting a moving endless conveyor in a helical path.

Another object of the invention is to provide a fixed, low friction support inside an enclosure for supporting an endless conveyor for movement relative to the enclosure, eliminating the need for a revolving drum inside the enclosure.

Yet another object is to provide a substantially rigid helical support assembly, formed of a plurality of flexible bands assembled onto a series of radially directed substantially rigid rods, for supporting an endless conveyor in a helical path in a simple, open frame structure to minimize the framework weight and interference with air circulation within an enclosure.

SUMMARY OF THE INVENTION

To achieve these and other objects, there is provided an apparatus for serially treating items for a predetermined time as they are transported within a controlled environment. The apparatus includes an enclosed housing having a base, a top, and an upright side wall means joining the base and top. An upright support means is fixed with respect to the housing inside the housing. A plurality of elongate, substantially rigid carrier members, substantially uniform in cross-section, are fixed with respect to the support means and arranged in a helical path about a substantially vertical axis. Each carrier member is disposed generally radially. A first elongate carrier band, substantially rigid in the vertical direction, has a plurality of horizontally formed band apertures. The band apertures conform at least generally to the carrier member cross-section in size and shape. Adjacent band apertures are spaced apart from one another in an amount corresponding to a first arcuate distance between adjacent carrier members at a predetermined first radius from the axis. Consequently, the carrier members cooperate to support the band in a substantially helical configuration along the helical path, with each carrier member extended through an associated band aperture.

The apparatus further includes a generally flat endless conveyor means for supporting and serially conveying a plurality of items. The conveyor means is supported by gravity above and with respect to the carrier band in parallel, spaced apart relation to the carrier members. An inlet and an outlet are formed through the housing at respective first and second locations along the conveyor means and near opposite ends of the helical path. A moving means is mounted with respect to the housing for moving the conveyor means relative to the carrier band and upright support means, to transport the items serially along the helical path from the inlet to the outlet at a predetermined velocity. A control means controls the environment inside the housing to effect a selected treatment of the items as they are transported along the helical path.

Preferably, the apparatus has a second carrier band, much like the first except with its band apertures closer to one another. This positions the second band at a predetermined second radius less than the first radius, so that the first and second bands form two concentric spirals. This permits the use of relatively narrow bands to support a relatively wide endless conveyor. More particularly, when the bands are constructed of steel, they can be sufficiently narrow to accommodate elastic bending about axes parallel to the helix axis, facilitating assembly of the bands onto the carrier members.

For sliding of the conveyor relative to the bands, the bands preferably are coated with a low friction substance, for example Teflon. An elongate strip of low friction material can be mounted on the carrier members and adjacent each band. Openings in the strip, spaced apart the same distance as the band apertures enable such mounting. Alternatively, a low friction coating can be applied to each band.

The conveyor support structure preferably includes a radially inward set of uprights and a radially outward set of uprights, both concentric on the helix axis. Then, the preferred carrier members can be elongate, cylindrical rods disposed horizontally between associated pairs of inward and outward uprights. This support structure facilitates mounting of an evaporator generally concentric and radially inwardly of the radially inward uprights. A fan mounted beneath the evaporator can generate a toroidal air circulation pattern, downwardly through the evaporator coils and upwardly through the helical path, for efficient cooling. The absence of the prior art revolving drum further enhances circulation.

In accordance with the present invention, the only moving component of the food support system is the endless conveyor. Frictional drag is minimized by providing low friction surfaces on the carrier bands as mentioned above, and also on the radially inward uprights. The carrier bands are thin in the horizontal dimension, and thus are lightweight, yet provide the necessary conveyor support. Each band flexs to facilitate assembly onto the carrier rods at their radially inward ends, but has elastic memory properties and tends to assume the desired arcuate configuration between each pair of adjacent carrier rods as it moves to its desired radius. Residual elastic bending force in the normally linear bands tends to fix adjacent rods with respect to one another, thus to rigidify the entire support structure. Thus is provided a sturdy, but open and relatively lightweight support structure for moving an endless conveyor.

IN THE DRAWINGS

For a better appreciation of the above and other features and advantages, reference is made to the following detailed description of the invention and the drawings, in which.

DETAILED DESCRIPTION OF THE PREFERRED EMBODIMENTS

Figure 1:
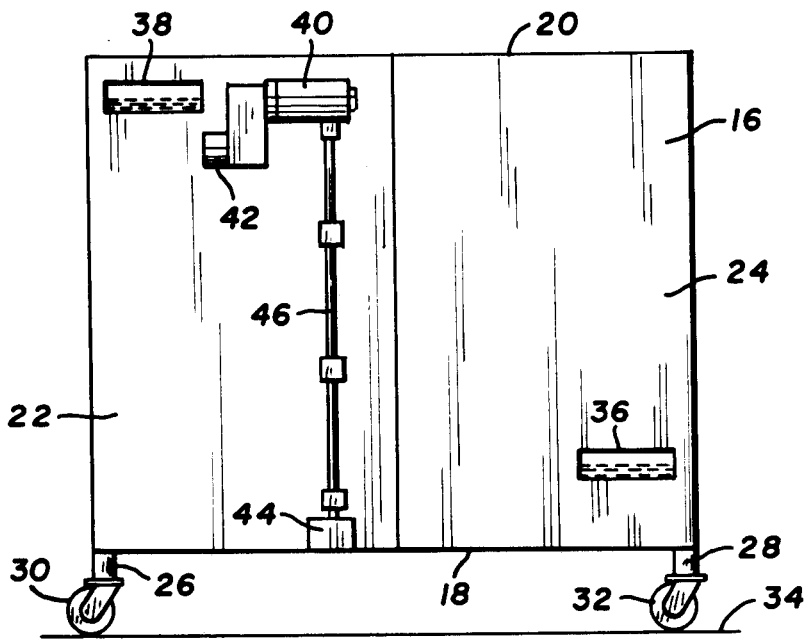
FIG. 1 is a front elevation of a portable refrigeration device constructed in accordance with the present invention.

Turning now to the drawings, there is shown in FIG. 1 a portable refrigeration device for serially and continuously processing items of prepared food. Packaged food items such as fresh vegetables, fish, or pizzas are loaded into the refrigeration device, carried along a path within the device at a speed commensurate with the time necessary for freezing the item, and removed from the device as frozen, ready for market products.

The refrigeration device includes an enclosed housing 16 including a horizontal base 18, a horizontal top 20, and upright wall means joining the base and top, including the front wall, left and right panels 22 and 24, opposite side walls, and a rear wall parallel to the front wall. The remaining upright walls are similarly composed of panels, and each panel is provided with thermally insulative lining as is known to those skilled in the art. Top 20 and base 18 are similarly insulative. A plurality of legs, two of which are shown at 26 and 28, depend downwardly from the base. Casters such as those shown at 30 and 32 are mounted to the legs for moving the refrigeration device along a floor 34.

An inlet opening 36 is formed in the right panel to permit insertion of food items to be frozen. After processing, the frozen food is removed from an outlet opening 38 formed through left panel 24. An electric conveyor drive motor 40 is mounted to the outside of the left panel, and drives a food supporting conveyor inside housing 16, to transport food items along a path from inlet opening 36 to outlet opening 38. A shield 42, attached to left panel 22, covers an opening through which a drive linkage associates the motor and food conveyor. Electric power to motor 40 is provided through a junction 44 and conduit 46 along left panel 22.

Figure 2:
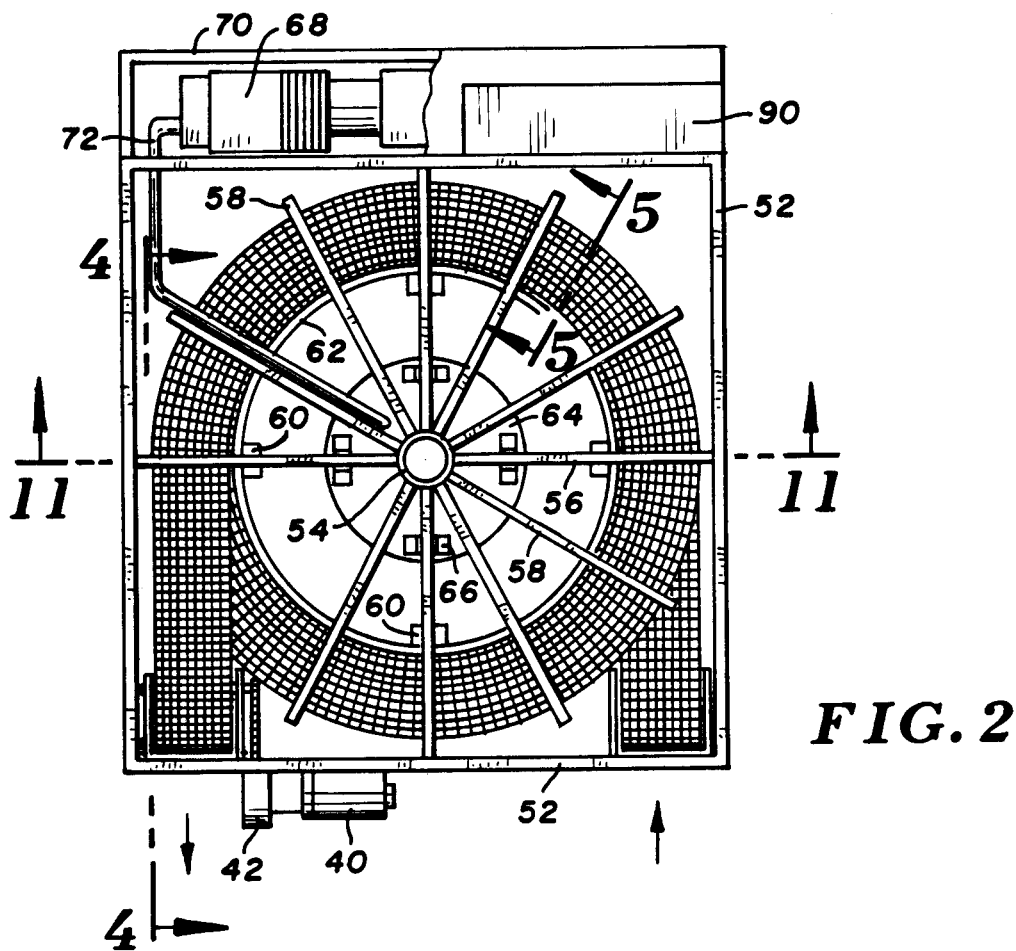
FIG. 2 is a top plan view of the device in FIG. 1, with portions of the device removed to enhance illustration of certain features.
Figure 3:
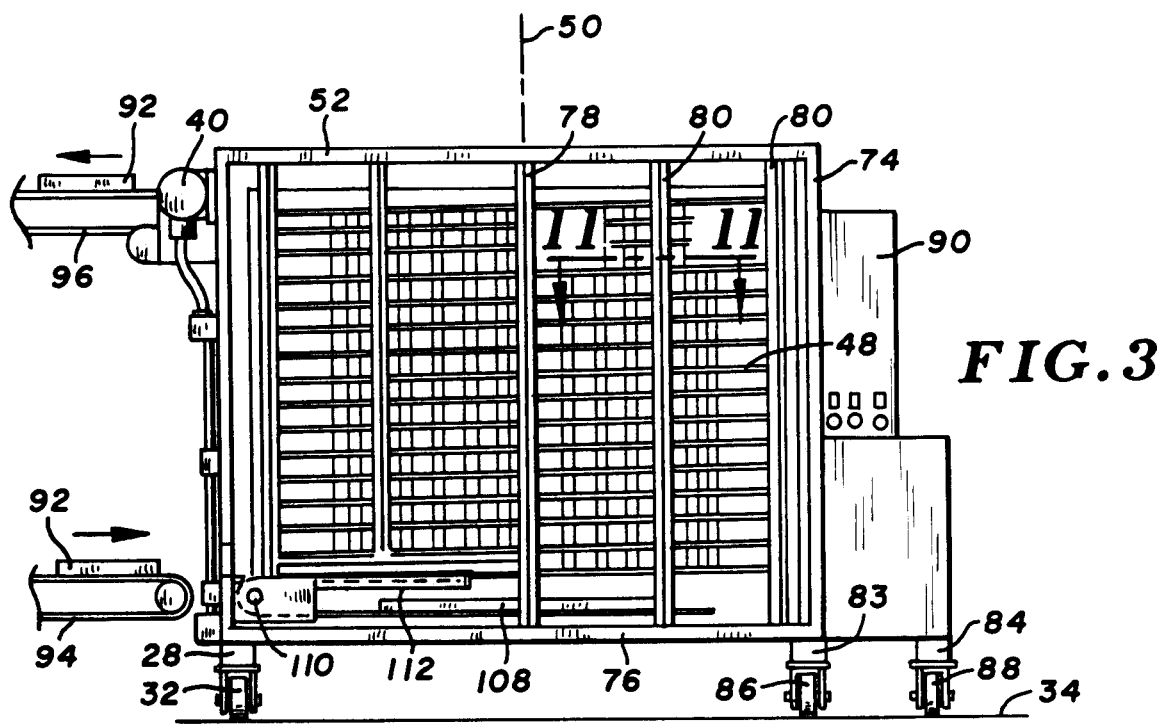
FIG. 3 is a side elevation of the device in FIG. 1, with portions removed to enhance illustration of certain features.

In FIGS. 2 and 3, the upright walls and top are removed to reveal an endless chain conveyor 48 inside housing 16. The majority of the length of conveyor 48 is arranged in a helical path, about a vertical helix axis 50. Conveyor 48 is movable with respect to the remainder of the refrigeration device, in order to translate food items serially along the helical path from inlet opening 36 to outlet opening 38 as they are refrigerated.

FIG. 2 shows four top frame members 52, which are part of a main frame that supports housing 16. A second framework is provided for supporting endless conveyor 48, and includes a central ring 54 and a plurality of radial frame members including four radial main bars 56 connected between ring 54 and one of top frame members 52, and a plurality of intermediate radial bars 58. Frame members 52, 56 and 58 are elongate, hollow and rectangular, and preferably constructed of steel.

Four brackets 60, one mounted to each main bar 56, locate an annular top band or collar 62 substantially concentric about helix axis 50. A cylindrical evaporator 64 also is substantially concentric on the helix axis, and is supported relative to main bars 56 by a plurality of evaporator support brackets 66.

Evaporator 64 is the sole component of the refrigeration system inside of housing 16. The remaining components, including a compressor 68, are mounted in an auxiliary housing 70 outside of the main housing. A refrigerant line 72 circulates refrigerant between evaporator 64 and the remainder of the system.

From FIG. 3 it is seen that the main frame further includes a plurality of upright corner members 74 between top main frame members 52 and a plurality of bottom main frame members 76. A plurality of main frame uprights 78 join associated top and bottom main frame members 52 and 76 a their centers. Each upright 78 also supports an associated one of radial main bars 56. A plurality of intermediate uprights 80 support intermediate radial bars 58. Main frame uprights 78 and intermediate uprights 80 together comprise the radially outward uprights for supporting endless conveyor 48. A plurality of radially inward guide uprights 82 are maintained in a circular configuration about the helix axis by top band 62, a bottom band, and a plurality of intermediate support bands. Guide uprights 82 provide a guide surface for the radially inward edge of conveyor 48, and preferably are constructed of a low friction material such as nylon, or if constructed of steel are coated with a low friction material.

FIG. 3 further illustrates additional legs 83 and 84 and casters 86 and 88 for supporting the rearward portion of main housing 16 and auxiliary housing 70. Also provided along the rear of the main housing is a control panel 90 for adjusting the temperature within housing 16, the speed of endless conveyor 48 and the like, and also for monitoring the conditions within the housing.

As indicated by the arrows in FIG. 3, conveyor 48 is moved along an upwardly spiraling path from inlet opening 36 to outlet opening 38. A series of prepared food items 92 are supplied to the inlet opening from a supply conveyor 94. The speed of conveyor 48 and temperature within housing 16 are such that items 92, when removed from housing 16 to a discharge conveyor 96, are sufficiently refrigerated, for example frozen.

Figure 4:
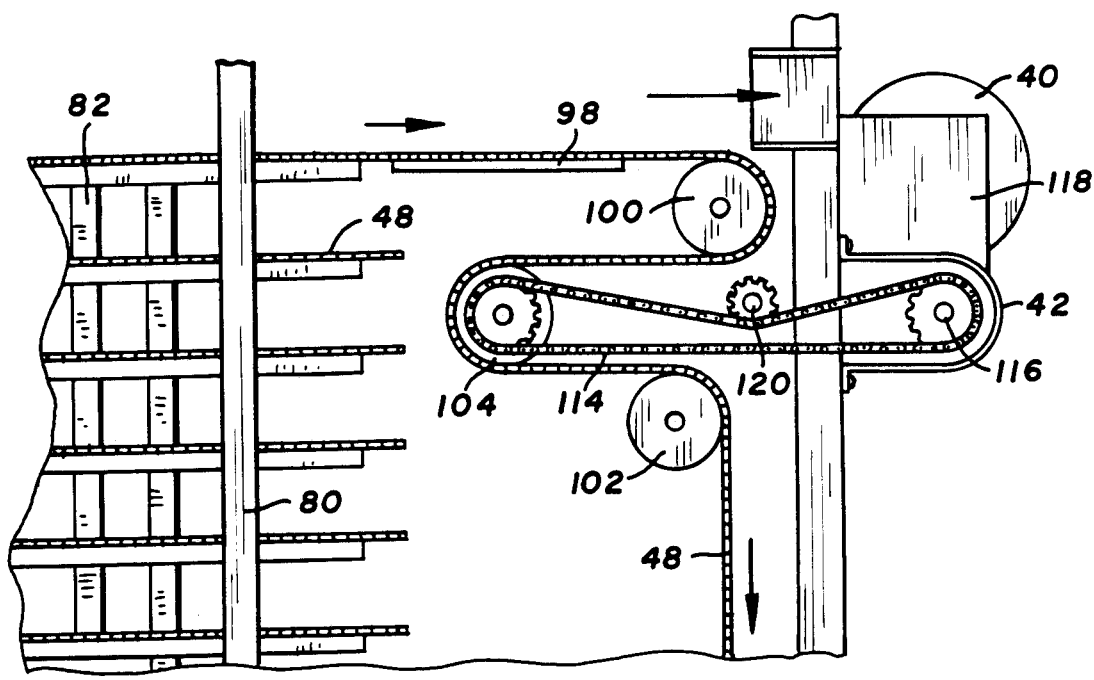
FIG. 4 is a sectional view taken along the line 4—4 in FIG. 2.

As seen from FIGS. 2 and 4, an upper, linear portion of conveyor 48 is supported by an upper tray 98, wrapped about two idler rollers 100 and 102 and an intermediate conveyor drive sprocket 104, and is directed downwardly to a roller 106, then in an arcuate, horizontal path near base 18 and along a curved guide plate 108 (FIG. 3), back and around a guide wheel 110 to a lower tray 112, then into the helical path once again. Sprocket 104 is driven by a chain 114 and chain drive sprocket 116, which is operably connected to motor 40 through a drive train within a gear box 118. An idler sprocket 120 provides the proper degree of tension in chain 114.

Figure 5:
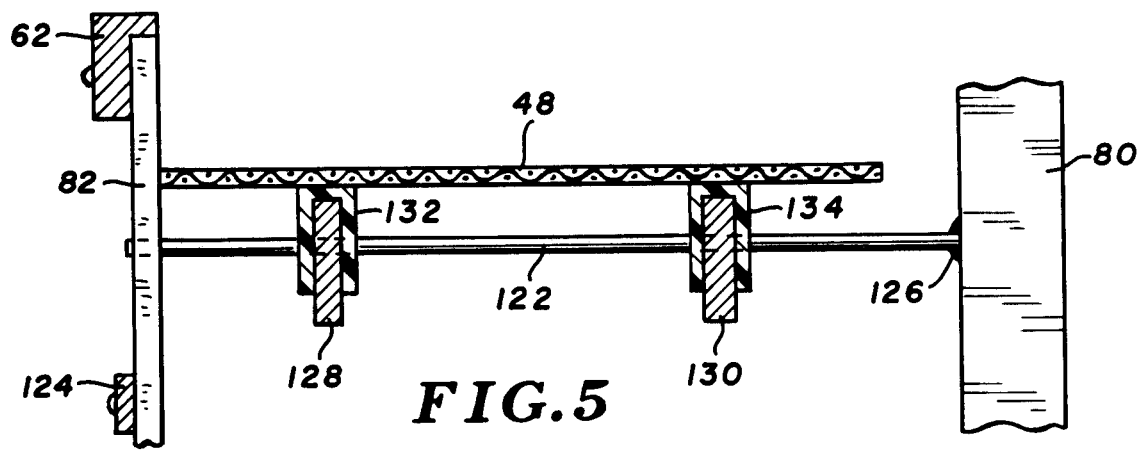
FIG. 5 is a sectional view taken along the line 5—5 in FIG. 2.

Endless conveyor 48 is supported over a series of elongate and cylindrical carrier rods 122, disposed radially of helix axis 50 and arranged in a helical path. As seen in FIG. 5, each of rods 122 is mounted through one of the radially outward uprights 78 or 80, and directed radially inward and into one of guide uprights 82, so that each carrier rod is rigidly supported between its associated inside and outside bar. Annular top band 62, and one of a plurality of annular intermediate bands 124, are shown. Rods 122 can be secured to the radially outward uprights by welding as shown at 126. First and second carrier bands 128 and 130 support conveyor 48 by gravity in parallel, spaced apart relation above carrier rods 122. To facilitate conveyor motion relative to the carrier bands, first and second strips 132 and 134 of low friction material such as Teflon, are mounted between the bands and conveyor.

Figure 6:
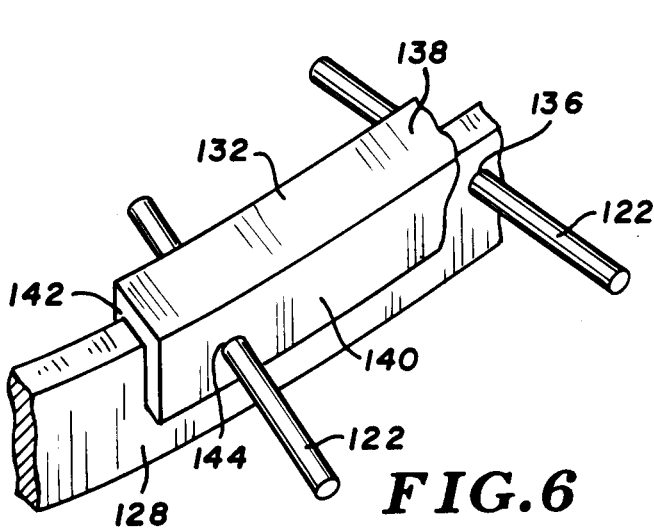
FIG. 6 is a detailed perspective view showing part of an endless conveyor support structure in the device.

FIG. 6 shows two of carrier rods 122 supporting a segment of first carrier band 128 and first low friction cover strip 132. Carrier band 128 preferably is constructed of a highly elastic material, such as a high yield strength steel. The carrier band has a width, generally vertical, in a range preferably of about ⅜ to 1¼ inches, and a horizontal thickness dimension of from ⅛ to ¼ of an inch. Consequently, the band is relatively rigid and does not bend in response to vertically applied forces, but readily bends about vertical axes. A series of band apertures, one of which is shown at 136, are formed horizontally through carrier band 128. The band apertures are uniformly spaced apart and conform to the cross-sectional size and shape of carrier rods 122, such that carrier band 128 fits slidably over the rods.

First cover strip 132 resembles an inverted "U" in cross-section, and conforms to the top and side surfaces of carrier band 128 so as to be contiguous with these band surfaces when mounted on the rods. Cover strip 132 preferably is scored to facilitate folding the strip into three longitudinal sections: a top section 138 directly supporting conveyor 48, and opposed side sections 140 and 142 contiguous with opposite sides of carrier band 128. A series of openings, one of which is shown at 144, are provided through side sections 140 and 142 at a spacing corresponding to the distance between neighboring band apertures 136. Openings 144 also conform in size and shape to carrier rods 122, and thus slidably accommodate them. With each carrier rod extending through its associated band aperture and pair of strip openings as shown in FIG. 6, strip 132 is fixed with respect to carrier band 128 and held in surface contact with the band as shown in FIG. 5. Second carrier band 130 and second carrier strip 134 are similarly formed and supported on the carrier rods.

Figure 7:
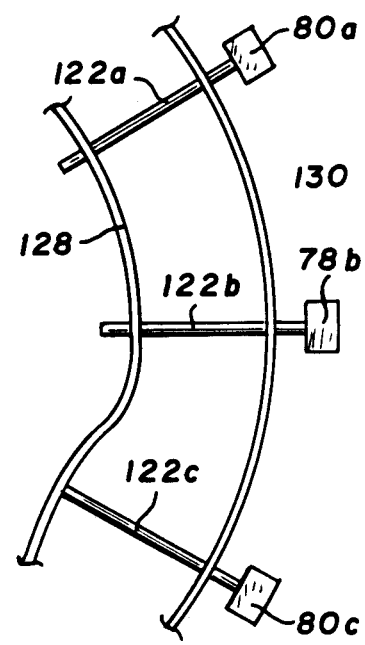
FIG. 7 is a schematic view of part of the support structure.

FIG. 7 illustrates a difference between the first and second carrier bands. In particular, second carrier band 130 is supported on rods 122 at a greater radius (radial distance from helix axis 50). Carrier bands 128 and 130 thus form two spirals concentric about the helix axis. The different radius is achieved simply by forming the band apertures of second carrier band 130 at a selected spacing corresponding to the second radius, of course greater than the spacing between the band apertures of first carrier band 128. Second carrier strip 134, not shown in FIG. 7, is formed with openings having the corresponding larger spacing.

FIG. 7 also illustrates the manner in which the carrier bands are assembled onto the carrier rods. Three carrier rods 122a, 122b and 122c are supported respectively by upright members 80a, 78b and 80c. The inside upright members are not yet installed, so that the radially inward ends of the rods are exposed. Second band 130 has been installed, and first carrier band 128 is being mounted upon the rods. For both bands 128 and 130, the spacing between neighboring band apertures is predetermined to correspond to a desired arcuate distance between adjacent carrier rods, in turn corresponding to a desired radius. In each case, the arcuate distance is less than the arcuate distance between adjacent outside upright members 78/80, and greater than the arcuate distance between adjacent radially inward ends of rods 122.

The elastic properties of the carrier bands facilitate their installation. In particular, a segment of carrier band 128 between carrier rods 122b and 122c is bent into the "S" configuration shown, or otherwise elastically deformed, to temporarily reduce the distance between the corresponding band apertures to equal the separation between adjacent carrier rod inward ends, to enable sliding insertion of the band upon the rods. Once inserted, carrier band 128 due to its elastic memory tends to assume the arcuate configuration shown between rods 122a and 122b.

The close fit between the band apertures and rods tends to fix each band at its desired radius. Further, each band has residual or elastic stored energy due to its curvature. Carrier bands 128 and 130 thus fix adjacent carrier rods with respect to each other, and substantially contribute to the rigidity and strength of the conveyor support structure. While FIG. 7 does not illustrate carrier strips 132 and 134, it is readily apparent that these strips are pre-aligned so that the strip openings match corresponding band apertures, whereupon each band and strip are simultaneously installed upon the rods.

Once carrier bands 128 and 130 are completely installed, guide uprights 82 are installed upon the rods and maintained by the annular bands in the arrangement shown in FIG. 5. Thus, a conveyor support framework including the guide uprights, outside uprights, rods, carrier band and the carrier strips, is easily assembled and rigid, yet "open frame" in nature for minimal interference with air circulation within housing 16.

Figure 8:
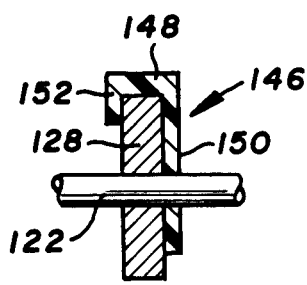
FIGS. 8–10 illustrate alternative embodiments of the support structure o FIG. 6.

FIG. 8 shows an alternative carrier strip 146, similar to carrier strips 132 and 134 in its material and in the provision of a top longitudinal section 148 and opposed side sections 150 and 152 Side section 152, however, is shortened so that strip openings are formed only through side section 150.

Figure 9:
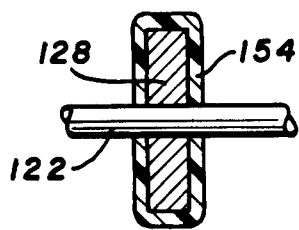

FIG. 9 shows yet another alternative for providing the required low friction surface for supporting conveyor 48: namely, a coating 154 of a low friction substance, for example Teflon, deposited upon carrier band 128. Band 128 may be fully coated as illustrated, or coated only over its upper surface areas.

Figure 10:
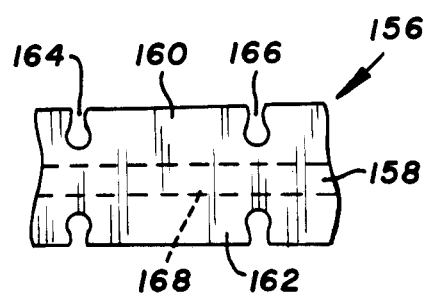

FIG. 10 illustrates another alternative carrier strip 156, configured to enable mounting of the strips after mounting their associated carrier bands. Alternative strip 156 includes longitudinal top and side sections 158, 160 and 162, respectively. In lieu of openings, a series of slots 164 are formed in side sections 160 and 162. Each slot has a narrowed neck portion 166 sufficiently wide to enable a slip fit over the rods with slight elastic deformation of the strip. The strip can be scored for folding along broken lines at 168.

Figure 11:
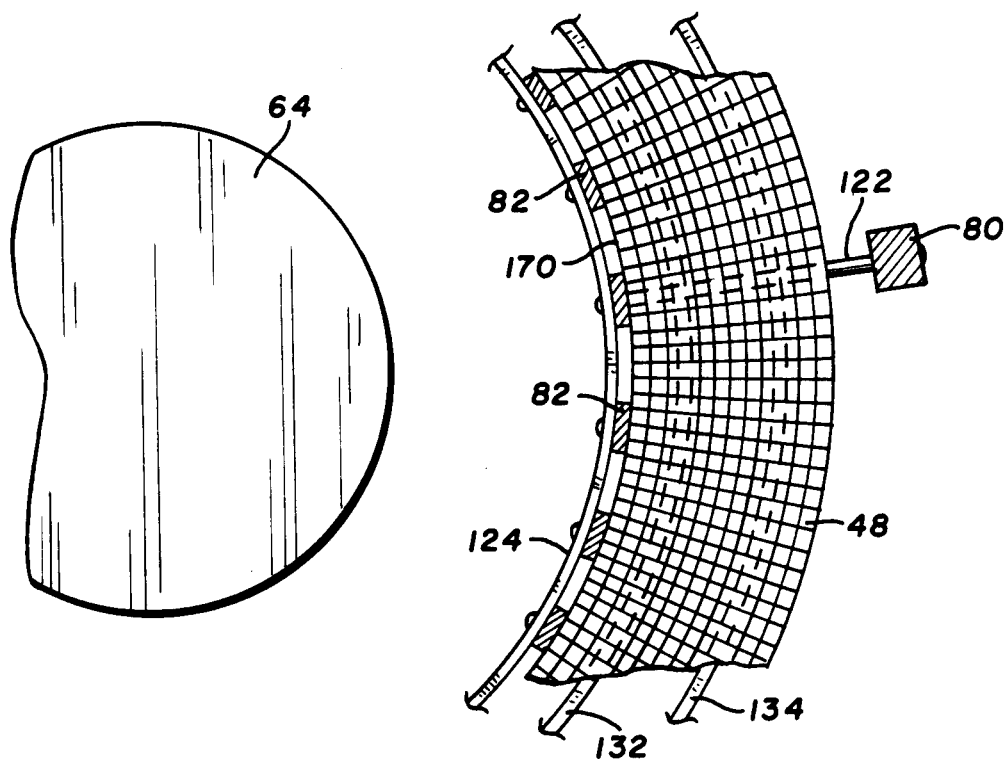
FIG. 11 is a sectional view taken along the line 11—11 in FIG. 3.

FIG. 11 illustrates a segment of endless conveyor 48 supported on a portion of the complete conveyor supporting structure. Part of evaporator 64 is shown as well, to illustrate its position in the helix formed by the conveyor and support structure. Conveyor 48 is a chain type conveyor, formed of a series of transversely extended link elements movable longitudinally with respect to one another to enable the conveyor to assume curved and linear configurations. For a more detailed disclosure of this type of chain, reference is made to U.S. Pat. No. 4,023,381 (Onodera), particularly FIG. 3 of that patent. One of rods 122 is shown between an intermediate upright 80 and one of guide uprights 82. Because guide uprights 82 also provide the arcuate guide surface for the inner edge 170 of conveyor 48, more of these uprights are provided, in particular four guide uprights 82 to every outside upright 78/80. Chain conveyor 48, like its supporting structure, is open to facilitate air circulation within housing 16, particularly around the food items supported on the conveyor.

Figure 12:
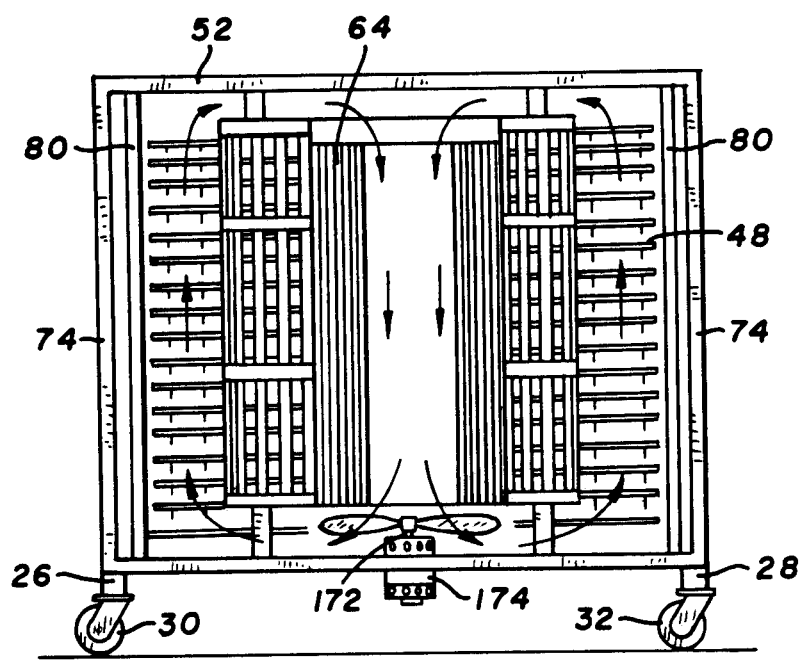
FIG. 12 is a front elevation illustrating air circulation in the refrigeration device.

The air circulation pattern is seen in FIG. 12. A fan 172, operated by a blower motor 174 mounted outside of the housing, pulls air downwardly through the coils of evaporator 64. The air then is directed radially outwardly along base 18, and travels upwardly through conveyor 48 and the supporting framework, whereupon it flows radially inwardly and returns to the evaporator. To minimize heat dissipation within housing 16, heat producing components of the refrigeration system are mounted outside of housing 16, as are blower motor 174 and conveyor drive motor 40. The open frame structure of the endless conveyor and conveyor support framework do not interfere with circulation of cooling air within the housing, and thus afford a considerable advantage in cooling efficiency as compared to structures utilizing a perforated revolving drum surrounding an evaporator. Further efficiency results from eliminating the need to rotate such a drum. The lighter overall weight, achieved by eliminating the drum and providing the open frame conveyor support structure, results in a portable mounting of the refrigeration device when using the aforementioned casters.

What is claimed is:

1. An apparatus for serially treating items for a predetermined time as they are transported within a controlled environment, said apparatus including:
   an enclosed housing including a base, a top, and an upright side wall means joining the base and top;
   an upright support means inside the housing and fixed with respect to the housing;
   a plurality of elongate, substantially rigid carrier members having a substantially uniform cross-section, said carrier members being fixed with respect to said support means and arranged in a helical path about a substantially vertical axis, with each carrier member generally radially disposed;
   a first elongate carrier band, substantially rigid in the vertical direction and having a plurality of band apertures formed horizontally therethrough and at least generally conforming to said carrier member cross-section in size and shape, adjacent ones of said band apertures spaced apart from one another an amount corresponding to a first arcuate distance between adjacent ones of said carrier members at a predetermined first radius, whereby said carrier members cooperate to support said band in a substantially helical configuration along said helical path, each carrier member extended through an associated one of said band apertures;
   a generally flat endless conveyor means for supporting and serially conveying a plurality of items, said conveyor means supported by gravity above and with respect to said carrier band in spaced apart relation to said carrier members;
   an inlet and an outlet formed through said housing at respective first and second locations along said conveyor means and near opposite ends of said helical path, and a moving means mounted with respect to said housing for moving said conveyor means relative to said carrier band and support means, to transport said items serially along said helical path from said inlet to said outlet at a predetermined velocity; and
   a control means for controlling the environment inside of said housing to effect a selective treatment of said items as they are transported along said helical path.

2. The apparatus of claim 1 wherein:
   said carrier members and said band apertures are uniformly spaced apart.

3. The apparatus of claim 2 wherein:
   said support means comprises a plurality of first upright members concentric about said axis, and a plurality of second upright members concentric about said axis and radially outwardly of said first upright members, each of said carrier members being supported between an associated first upright member and second upright member.

4. The apparatus of claim 3 wherein:
   said band is constructed of steel, and has a cross-sectional width substantially greater than its cross-sectional thickness whereby the band is substantially rigid in its width direction and substantially flexible along its thickness, said band disposed with its thickness dimension horizontal and its width dimension generally vertical.

5. The apparatus of claim 4 wherein:

each of said carrier members comprises an elongate cylindrical rod, and wherein each of said band apertures is circular, each rod being slidable within its associated aperture relative to said carrier band.

6. The apparatus of claim 5 further including:
a layer of a low friction material mounted with respect to said carrier band, and disposed between said band and said conveyor means.

7. The apparatus of claim 6 wherein:
said layer comprises an elongate strip including a first longitudinal section disposed along a top edge of said band, and a second longitudinal section disposed along one side of said band.

8. The apparatus of claim 7 including:
means forming a plurality of openings through said second longitudinal section of said strip, spaced apart from one another a distance equal to the spacing between adjacent band apertures.

9. The apparatus of claim 8 wherein:
said strip includes a third longitudinal section disposed along an opposite side of said band, and means forming a plurality of further openings through said third longitudinal section spaced apart from one another a distance equal to the spacing between adjacent band apertures.

10. The apparatus of claim 3 wherein:
said first upright members have low friction surfaces contacting a radially inside edge of said conveyor means.

11. The apparatus of claim 1 further including:
a second carrier band substantially similar to said first carrier band but with the band apertures of said second carrier band spaced apart from one another an amount corresponding to a second arcuate distance between adjacent associated carrier members at a predetermined second radius greater than said first radius, whereby said first and second bands form two concentric spirals along said helical path.

12. The apparatus of claim 1 wherein:
said moving means comprises a motor mounted to said housing outside of said housing, and a drive train operatively linking said motor and conveyor means through an opening in said housing.

13. The apparatus of claim 1 further including:
a plurality of casters supported with respect to said housing and beneath said base.

14. The apparatus of claim 1 wherein:
said control means comprises a cylindrical evaporator mounted inside of said housing, an surrounded by and generally concentric with said helical path, for refrigerating the air inside said housing.

15. A refrigeration apparatus including:
an enclosed housing including a base, a top, and an upright side wall means joining the base and top, and an evaporating means generally centrally mounted within said housing;
a first upright support means inside of said housing, surrounding said evaporator and fixed with respect to the housing;
a plurality of elongate, substantially rigid carrier members of a substantially uniform transverse section, supported by said support means in a helical path about a substantially vertical helix axis, each carrier member being generally radially disposed;
a first elongate carrier band substantially rigid in the vertical direction and having a plurality of horizontal band openings formed therethrough and generally conforming to the size and shape of said transverse section, adjacent ones of said band openings spaced apart from one another a first distance corresponding to a first arcuate distance between adjacent associated ones of said carrier members at a first predetermined radius, and a second elongate carrier band substantially identical to said first carrier band but with its corresponding band apertures spaced apart from one another a second distance corresponding to an arcuate distance between adjacent carrier members at a second predetermined radius greater than said first radius, whereby said first and second bands and said carrier members form a helical conveyor supporting assembly with said carrier members extended through associated apertures in said first and second carrier bands;
a generally flat endless conveyor means for serially conveying a plurality of food items, said conveyor means supported by gravity over said carrier bands and in spaced apart relation to said carrier members; and
an inlet means and an outlet means formed through said housing and proximate said endless conveyor means proximate opposite ends of said helical path, and a transport means for moving said conveyor means relative to said carrier bands and support means, to transport said food items serially along said helical path from said inlet means to said outlet means and at a predetermined speed.

16. The apparatus of claim 15 further including:
a loading means for depositing said food items onto said conveyor means near said inlet means, and a discharge means near said outlet means for carrying food items away from said conveyor means.

* * * * *